(12) United States Patent
Wright (10) Patent No.: US 10,954,982 B2
(45) Date of Patent: Mar. 23, 2021

(54) CONSTRUCTION NAILING SCREW

(71) Applicant: William A. Wright, Westfield, IN (US)

(72) Inventor: William A. Wright, Westfield, IN (US)

(*) Notice: Subject to any disclaimer, the term of this patent is extended or adjusted under 35 U.S.C. 154(b) by 598 days.

(21) Appl. No.: 15/840,542

(22) Filed: Dec. 13, 2017

(65) Prior Publication Data

US 2018/0163763 A1    Jun. 14, 2018

Related U.S. Application Data

(60) Provisional application No. 62/433,588, filed on Dec. 13, 2016.

(51) Int. Cl.
| | |
|---|---|
| *F16B 15/08* | (2006.01) |
| *F16B 19/14* | (2006.01) |
| *B25C 1/04* | (2006.01) |
| *F16B 15/06* | (2006.01) |
| *F16B 25/00* | (2006.01) |

(52) U.S. Cl.
CPC .............. *F16B 19/14* (2013.01); *B25C 1/047* (2013.01); *F16B 15/06* (2013.01); *F16B 25/0015* (2013.01); *F16B 25/0063* (2013.01)

(58) Field of Classification Search
CPC ....................................................... F16B 15/06
USPC ....... 411/453, 417, 418, 420, 421, 402, 403, 411/408
See application file for complete search history.

(56) References Cited

U.S. PATENT DOCUMENTS

| | | | | |
|---|---|---|---|---|
| 395,925 | A * | 1/1889 | Rose | |
| 1,048,590 | A * | 12/1912 | Russell | F16B 25/00 411/417 |
| 1,303,002 | A * | 5/1919 | Abrahams | F16B 15/06 411/455 |
| 1,698,951 | A * | 1/1929 | Holmes | F16B 25/0015 411/453 |
| 3,022,701 | A * | 2/1962 | Potruch | F16B 15/06 411/80.1 |
| 3,850,073 | A * | 11/1974 | Hayes | F16B 15/06 411/453 |
| 4,900,208 | A * | 2/1990 | Kaiser | E04D 3/3603 411/188 |
| 4,902,208 | A * | 2/1990 | Wood | F04B 1/1136 417/462 |
| 5,110,245 | A * | 5/1992 | Hiroyuki | F16B 25/0015 411/417 |

(Continued)

*Primary Examiner* — Gary W Estremsky
(74) *Attorney, Agent, or Firm* — Bruce J. Bowman (57) ABSTRACT

A construction nailing screw is configured to be used in like manner as traditional nails but rotate during driving through threading, providing retention of the construction nailing screw in the construction material(s), and the ability to be removed from the construction material(s) by reverse rotation. The construction nailing screw is characterized by a shank with a head on one longitudinal end, and a tip on another longitudinal end, with external threading that provides minimal friction during installation and mild resistance during removal, and two cutouts extending along the exterior of the shank and through the external threading. The head allows both a manual installation tool and an automatic installation tool to strike the head and drive (install) the nailing screw. The external threading has an upper side with a high pitch relative to the longitudinal axis of the shank, and a lower side with a low pitch relative to the longitudinal axis of the shank.

4 Claims, 7 Drawing Sheets (56) References Cited

U.S. PATENT DOCUMENTS

| | | | | |
|---|---|---|---|---|
| 5,759,003 A | * | 6/1998 | Greenway | F16B 25/0015 |
| | | | | 411/399 |
| 7,097,404 B2 | * | 8/2006 | Avganim | B25B 15/005 |
| | | | | 411/2 |
| 7,744,323 B2 | * | 6/2010 | Kim | F16B 15/02 |
| | | | | 411/451.1 |
| 10,072,691 B2 | * | 9/2018 | Schachner | F16B 15/02 |

\* cited by examiner

CONSTRUCTION NAILING SCREW

CROSS-REFERENCE TO RELATED APPLICATIONS

This U.S. non-provisional patent application claims the benefit of and/or priority under 35 U.S.C. § 119(e) to U.S. provisional patent application Ser. No. 62/433,588 filed Dec. 13, 2016 titled "Nailing Screw," the entire contents of which is specifically incorporated herein by reference.

BACKGROUND OF THE INVENTION

Field of the Invention

The present invention relates to fasteners for installing construction material such as drywall, sheetrock, plasterboard, plywood, sheeting and the like and, more particularly, to nails for installing construction material such as drywall, sheetrock, plasterboard, plywood, sheeting and the like.

Background

Nails and screws are predominate ways of installing various construction materials such as, but not limited to, drywall, sheetrock, plasterboard, plywood, sheeting, flashing, shingles, and the like. There are many varieties of both nails and screws depending on the application and/or material being installed. Nails are typically distinguishable from screws by the difference in configuration of their shanks. Nails have a predominately smooth shank while screws have threading. Nails are fashioned to be used through striking, hitting, or otherwise driving the nail into the construction material with a manual or powered hammer, air hammer, impact driver, and/or the like (collectively "hammers"). As such, nails have a head with a generally planar top for receiving driving blows of a hammer. Screws are fashioned to be used through rotating, twisting, or otherwise turning the screw into the construction material with a manual or powered screwdriver, rotary air tool, and/or the like (collectively, "screw drivers"). As such, screws have a configuration in the top of their screw head that accepts a screw driver for rotation.

While nails are typically easier to install than screws, screws generally hold better than nails. However, a problem with nails is their inability to be easily removed or adjusted once installed. Screws can be more easily removed or adjusted once installed versus nails, but are typically more time consuming to use.

It is evident from the above that what is needed is a construction nail with screw features and/or characteristics that allow the construction nail to be installed using nail hammers (as defined above) but which holds like a screw and may be removed through rotation.

It is therefore an object of the present invention to provide a construction nail with screw features and/or characteristics that allow the construction nail to be installed via nail hammers. It is also an object of the present invention to provide a construction nailing screw. Other and further objects, while not expressly mentioned, are contemplated.

SUMMARY OF THE INVENTION

A construction nail, nail screw, or nailing screw (collectively, "construction nailing screw" or "nailing screw") is configured to rotate during insertion—providing retention of the construction nailing screw in the object (e.g. construction material(s)), and the ability to be removed from the construction material(s) by reverse rotation. The construction nailing screw can be installed manually by a hammer or by an automatic installation device (e.g. an air gun) in like manner to typical nails.

The construction nailing screw is characterized by a shank with a head on one longitudinal end, and a tip on another longitudinal end, the shank provided with external threading that is configured to provide minimal friction during insertion (nailing), and mild resistance during removal (rotation), and two flats or flutes extending along the outside longitudinal length of the shank and through the external threading. The head is configured to allow both a manual installation tool (e.g. hammer) and an automatic installation tool (e.g. a nailing gun) to strike the head and drive the nailing screw.

The external threading is configured such that an upper side of the threading has a high pitch relative to the longitudinal axis of the shank, while a lower side of the threading has a low pitch relative to the longitudinal axis of the shank.

For receipt of a manual installation tool, the top of the head is configured to accept one or more of any variety of manual installation tools such as, but not limited to, Phillips, slotted, Allen, Torx®, Pozidriv®, Robertson®, or other.

For receipt of an automatic installation tool, the head of the nailing screw has a plurality of sloping or stepped teeth, gears, steps or the like that are configured to mesh with oppositely or reverse sloping or stepped teeth, gears, steps or the like of a piston of the automatic installation tool, and a recess for receipt of a centering pin of the automatic installation tool. The automatic installation tool drives the nailing screw down and applies a slight rotation to the nailing screw at the end of the driving stroke.

In one form, the flats or flutes are situated on the shank diametrically opposite (i.e. 180°) one another. The flats or flutes preferably, but not necessarily, extend from the head to the tip. In one form, the flats or flutes are co-axial with the longitudinal axis of the shank of the nailing screw, while in another form, the flats or flutes spiral with respect to the longitudinal axis of the shank of the nailing screw.

Further aspects of the present invention will become apparent from consideration of the drawings and the following description of forms of the invention. A person skilled in the art will realize that other forms of the invention are possible and that the details of the invention can be modified in a number of respects without departing from the inventive concept. The following drawings and description are to be regarded as illustrative in nature and not restrictive.

BRIEF DESCRIPTION OF THE DRAWINGS

The features of the invention will be better understood by reference to the accompanying drawings which illustrate forms of the present invention, wherein.

DETAILED DESCRIPTION OF FORMS OF THE INVENTION

Referring to FIGS. 1-5, there is depicted an exemplary form of a construction nailing screw (nailing screw) generally designated 10 fashioned in accordance with the present principles. The nailing screw 10 is formed of a suitable material such as, but not limited to, a metal. The nailing screw 10 has a longitudinal shank or shaft 11 with a head 12 at one longitudinal end and a tip 13 at another longitudinal end, the nailing screw 10 thus having a longitudinal axis 23 (see, e.g., FIG. 3). The shank 11 transitions to the head 12 via a tapered neck 14.

The shank 11 has external threading 16 about its outside surface that extends generally from the neck 14 to the tip 13, although other lengths of threading covering a portion or portions of the shank are contemplated. The threading 16 has an upper side 17 defining a ledge that spirals along the longitudinal length of the shank 11. The upper side 17 has a high pitch or angle R (see FIG. 2) relative to the longitudinal axis 23 of the shank 11. The threading 16 has a lower side 22 that spirals along the longitudinal length of the shank 11. The lower side 22 has a low pitch or angle relative to the longitudinal axis 23 of the shank 11. The lower side 22 has a length L (see FIG. 2) that is long compared to typical screw threading. The combination of a high pitched upper side 17 and a low pitched lower side 22 provides a nail screw with threading that creates minimal friction during installation of the nailing screw 10, has good retention, and allows removal by reverse rotation. Installation of the nailing screws herein is accomplished via striking the head of the nailing screw in the same manner as a typical nail. This can be done either manually or automatically.

The shank 11 further includes a first flat 15a extending through the threading 16 from the neck 14 to the tip 13, and a second flat 15b extending through the threading 16 from the neck 14 to the tip 13. The first and second flats 15a, 15b are preferably, but not necessarily, situated diametrically opposite one another (i.e. 180°) about the shank 11, and are generally coaxial with the longitudinal axis 23 of the nailing screw 10. More than two flats may be used if desired. Also, flutes may be provided rather than flats.

The head 12 is preferably, but not necessarily, round or rounded and includes a central depression or hole 18 in its upper surface. The top of the head 12 is configured to receive an installation or driving tool (manual or automatic). In this embodiment, the configuration consists of four slots 19a, 19b, 19c, 19d that radiate outwardly from the depression 18, being configured for receipt of a Phillips type driving tool. The head 12 may have configurations for other styles or types of driving tools such as, but not limited to, slotted, Allen, Torx®, Pozidriv®, Robertson®, or other. In accordance with an aspect of the present invention, the head 12 further includes a plurality of sloping or stepped teeth, gears, steps or the like (collectively, teeth) 20 that are situated about the outside rim, edge or periphery. Each tooth 20 defines a ledge 21. As explained below, the teeth 20 are configured to cooperate with the configuration of the automatic installation or nailing tool of FIGS. 6-8 (or other like) in order to automatically drive or install the nailing screws shown and described herein.

Figure 1:
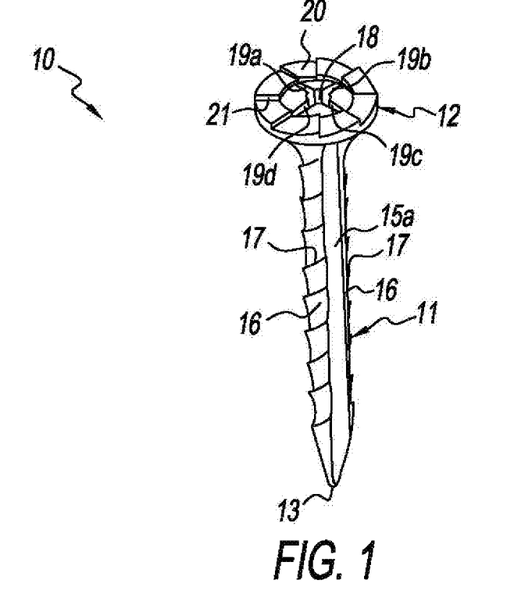
FIG. 1 is an isometric view of an exemplary construction nailing screw fashioned in accordance with the principles of the present invention.
Figure 2:
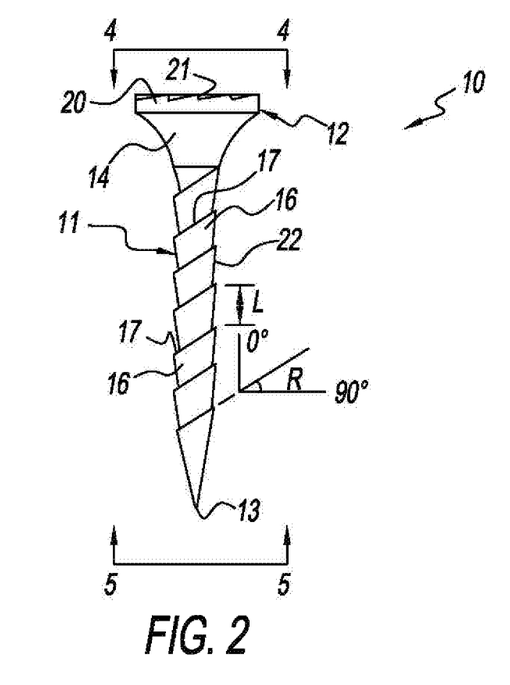
FIG. 2 is a side view of the construction nailing screw of FIG. 1, the drawing illustrating pitch or angle of sides of the threading relative to a longitudinal axis of the construction nailing screw.
Figure 3:
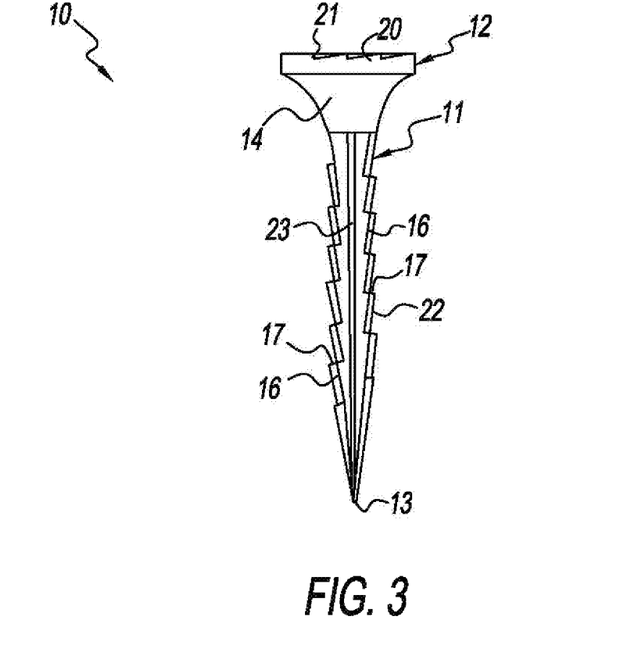
FIG. 3 is a sectional side view of the construction nailing screw of FIG. 1.
Figure 4:
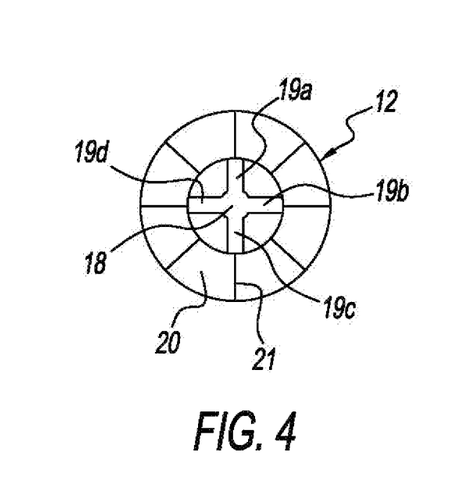
FIG. 4 is a top plan view of the construction nailing screw of FIG. 1 taken along line 4-4 of FIG. 2.
Figure 5:
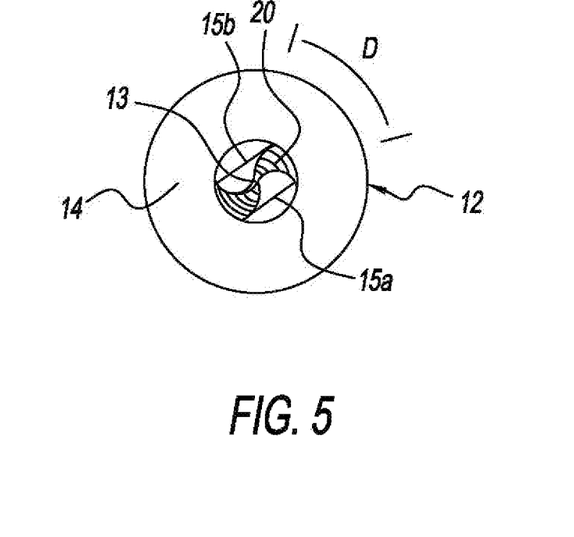
FIG. 5 is a bottom plan view of the nailing screw of FIG. 1 taken along line 5-5 of FIG. 2.
Figure 6:
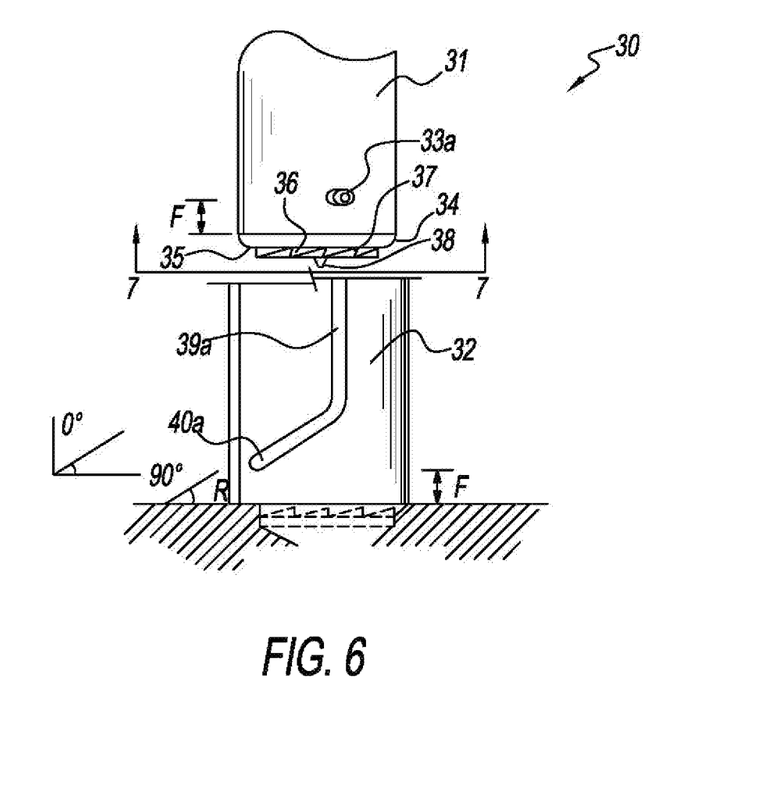
FIG. 6 is a side view of a portion of an exemplary automatic driver/hammer for the construction nailing screws of the present invention.
Figure 7:
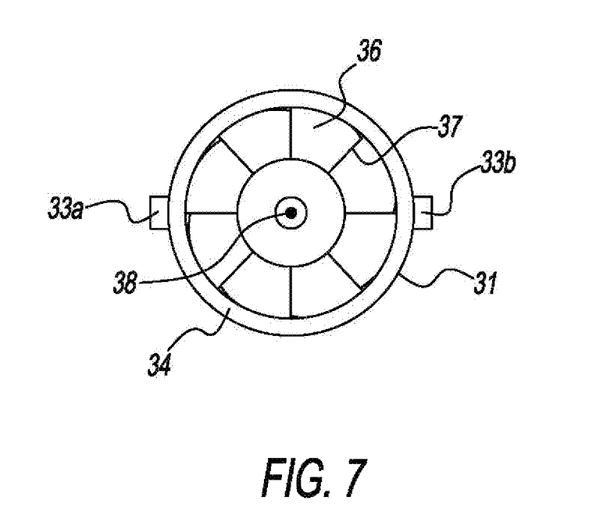
FIG. 7 is a bottom plan view of a piston of the automatic driver/hammer of FIG. 6 taken along line 7-7 thereof.
Figure 8:
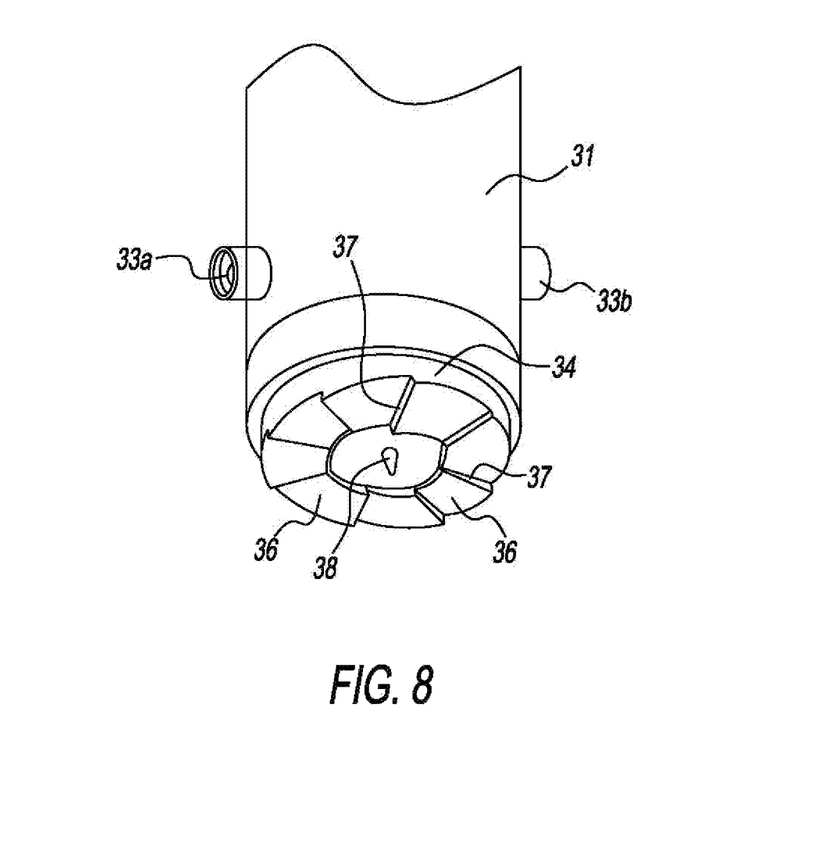
FIG. 8 is an enlarged isometric lateral view of the piston of the automatic driver/hammer of FIG. 6.

Referring to FIGS. 6-8, there is depicted an exemplary automatic installation tool generally designated 30 for use with the nailing screws shown and described herein. The automatic installation tool 30 has a piston 31 and a sleeve (piston chamber) 32. The piston 31 is generally cylindrical having first and second sleeved pins, knobs, or projections (collectively, pins) 33a, 33b extending from the outside of the piston 31. The first and second sleeved pins 33a, 33b each are configured to provide a rolling surface, the purpose of which is described below. The first and second pins 33a, 33b are preferably, but not necessarily, situated diametrically opposite one another (i.e. 180°). Proximate the bottom of the piston 31 is a sloping, angled or tapered portion 34. As depicted in FIG. 6, this provides a recess or countersink to the drywall or other material being nailed. The end of the piston 31 has a centering pin 38 that is configured to be received in the depression 18 of the nailing screw head 12 in order to align the nailing screw with the piston. The end of the piston 31 has a plurality of sloping or stepped teeth, gears, steps or the like (collectively, teeth) 36 that are situated about the outside rim, edge or periphery thereof. Each tooth 36 defines a ledge 37. The teeth 36 of the piston 31 are reverse relative to the teeth 20 of the nailing screw head 12 in order to allow the teeth 36 of the piston 31 to engage the teeth 20 of the nailing screw head 12 and rotate the nailing screw during the last portion of the installation/ driving of the nailing screw. The sleeve 32 is generally cylindrical having an interior sized to receive the piston 31. The sleeve 32 has first and second slots 39a, 39b (of which only one slot 39a is seen in the Figures) that each extend from the top of the sleeve 32, down its side, and terminating in an angled section 40a, 40b respectively. The slots 39a, 39b are sized to receive the sleeved pins 33a, 33b of the piston 31. The sleeved pins 33a, 33b align in the slots 39a, 39b such that the slots 39a, 39b guide the sleeved pins 33a, 33b. The slots 39a, 39b guide the piston 31 as it travels down the sleeve 32. Towards the end of its travel, the piston 31 is rotated diagonally by the angled sections 40a, 40b at the same angle R as the angle R of the threading 16 of the nailing screw 10. The nailing screw 10 is held within the sleeve. The teeth 36 of the piston 31 engage the teeth 20 of the nailing screw 10 to drive and rotate the nailing screw 10 to lock into the drywall or other material. The pin distance F from the piston head and the distance F from the bottom of the chamber guides should be equal. The automatic driving tool thus strikes the nailing screw to drive the nailing screw into the construction material (or other) like a typical nail, but which provides a twist or rotation at the end of the downward stroke of the piston 31 whereby the nailing screw is slightly rotated at the end of its driving force.

Figure 9:
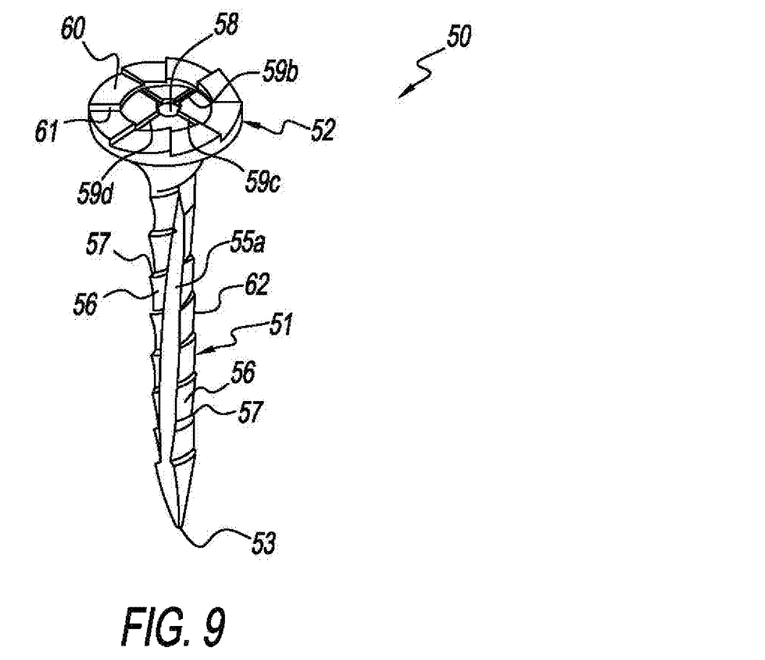
FIG. 9 is an isometric view of another exemplary construction nailing screw fashioned in accordance with the principles of the present invention.

FIG. 9 depicts another exemplary form of a nailing screw generally designated 50 fashioned in accordance with the present principles, and usable with the automatic installation tool 30 or a manual driver (not shown). The nailing screw 50 is formed of a suitable material such as, but not limited to, a metal. The nailing screw 50 has a longitudinal shank or shaft 51 with a head 52 at one longitudinal end and a tip 53 at another longitudinal end, the nailing screw 50 thus having a longitudinal axis. The shank 51 transitions to the head 52 via a tapered neck 54.

The shank 51 has external threading 56 about its outside surface that extends generally from the neck 54 to the tip 53, although other patterns of threading may be used. The threading 56 has an upper side 57 defining a ledge that spirals along the longitudinal length of the shank 51. The upper side 57 has a high pitch or angle R relative to the longitudinal axis of the shank 51. The threading 56 has a lower side 62 that spirals along the longitudinal length of the shank 51. The lower side 62 has a low pitch or angle relative to the longitudinal axis of the shank 51. The lower side 62 has a length L in like manner to the nailing screw 10 (see FIG. 2) that is long compared to typical screw threading. The combination of a high pitched upper side 57 and a low pitched lower side 62 provides a nail screw with threading that creates minimal friction during installation of the nailing screw 50, has good retention, and allows removal by reverse rotation.

The shank 51 further includes a first flat 55a extending through the threading 56 from the neck 54 and spiraling slightly relative to the longitudinal axis to the tip 53, and a second flat 55b extending through the threading 56 from the neck 54 and spiraling slightly relative to the longitudinal axis to the tip 53. Spiraling of the flats 55a, 55b aid in rotation of the nailing screw during installation. The first and second flats 55a, 55b are preferably, but not necessarily, situated diametrically opposite one another (i.e. 180°) about the shank 51. More than two flats may be used if desired. Also, flutes may be provided rather than flats.

The head 52 is preferably, but not necessarily, round or rounded and includes a central depression or hole 58 in its upper surface. Four slots 59a, 59b, 59c, 59d radiate outwardly from the depression 58 that are configured for receipt of a Phillips driving tool. The head 52 may have configurations for other styles or types of driving tools such as, but not limited to, slotted, Allen, Torx®, Pozidriv®, Robertson®, or other. In accordance with an aspect of the present invention, the head 52 further includes a plurality of sloping or stepped teeth, gears, steps or the like (collectively, teeth) 60 that are situated about the outside rim, edge or periphery. Each tooth 60 defines a ledge 61. As explained below, the teeth 60 are configured to cooperate with the configuration of the automatic installation or nailing tool of FIGS. 6-8 in order to automatically drive or install the nailing screws shown and described herein.

Figure 10:
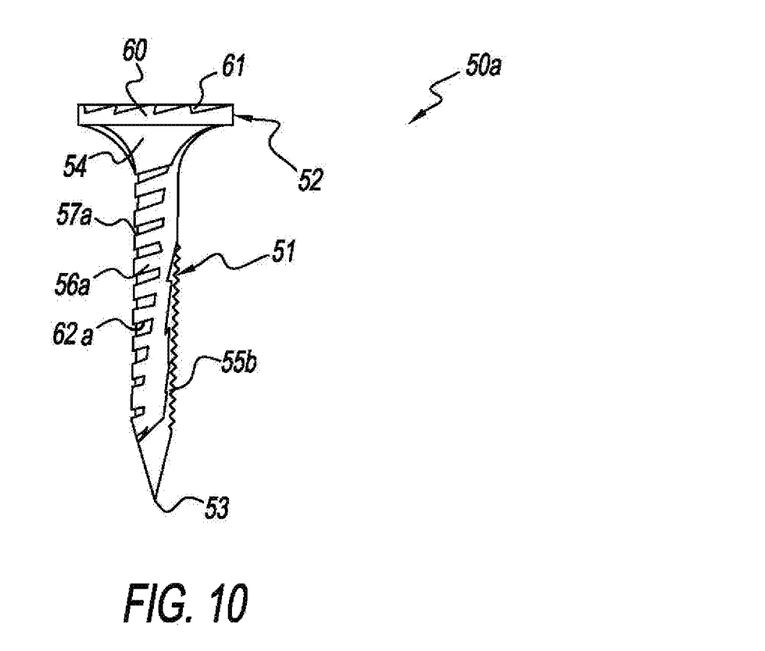
FIG. 10 is an isometric view of another exemplary construction nailing screw fashioned in accordance with the principles of the present invention.

FIG. 10 depicts another exemplary form of a nailing screw generally designated 50a fashioned in accordance with the present principles, and usable with the automatic installation tool 30 or a manual driver (not shown). The nailing screw 50a is formed of a suitable material such as, but not limited to, a metal. The nailing screw 50a has a longitudinal shank or shaft 51 with a head 52 at one longitudinal end and a tip 53 at another longitudinal end, the nailing screw 50a thus having a longitudinal axis. The shank 51 transitions to the head 52 via a tapered neck 54.

The shank 51 has external threading 56a about its outside surface that extends generally from the neck 54 to the tip 53 although other threading patterns may be used. The threading 56a has an upper side 57a defining a ledge that spirals along the longitudinal length of the shank 51. The upper side 57a has a high pitch or angle R relative to the longitudinal axis of the shank 51 that is different from the pitch of the upper side 57 of the nailing screw 50. The threading 56a has a lower side 62a that spirals along the longitudinal length of the shank 51. The lower side 62a has a low pitch or angle relative to the longitudinal axis of the shank 51 that is different from the pitch of the lower side 62 of the nailing screw 50. The lower side 62a has a length L in like manner to the nailing screw 50 (see FIG. 9) that is long compared to typical screw threading. The combination of a high pitched upper side 57a and a low pitched lower side 62a provides a nail (nailing) screw with threading that creates minimal friction during installation (striking) of the nailing screw 50a, has good retention, and allows removal by reverse rotation.

The shank 51 further includes a first flat 55b extending through the threading 56a from the neck 54 and spiraling slightly relative to the longitudinal axis to the tip 53, and a second flat (not seen) extending through the threading 56a from the neck 54 and spiraling slightly relative to the longitudinal axis to the tip 53. Spiraling of the flats 55b, not seen, aid in rotation of the nailing screw during installation. The first and second flats are preferably, but not necessarily, situated diametrically opposite one another (i.e. 180°) about the shank 51. More than two flats may be used if desired. Also, flutes may be provided rather than flats.

The head 52 is preferably, but not necessarily, round or rounded and includes a central depression or hole 58 in its upper surface. Four slots 59a, 59b, 59c, 59d radiate outwardly from the depression 58 that are configured for receipt of a Phillips driving tool. The head 52 may have configurations for other styles or types of driving tools such as, but not limited to, slotted, Allen, Torx®, Pozidriv®, Robertson®, or other. In accordance with an aspect of the present invention, the head 52 further includes a plurality of sloping or stepped teeth, gears, steps or the like (collectively, teeth) 60 that are situated about the outside rim, edge or periphery. Each tooth 60 defines a ledge 61. As explained below, the teeth 60 are configured to cooperate with the configuration of the automatic installation or nailing tool of FIGS. 6-8 in order to automatically drive or install the nailing screws shown and described herein.

FIGS. 11-14, there is depicted another exemplary form of a nailing screw generally designated 70 fashioned in accordance with the present principles, that is usable via a manual installation tool (not shown) or an automatic driving tool (e.g. automatic installation tool 30). The nailing screw 70 is formed of a suitable material such as, but not limited to, a metal. The nailing screw 70 has a longitudinal shank or shaft 71 with an oversized head 72 at one longitudinal end and a tip 73 at another longitudinal end, the nailing screw 70 thus having a longitudinal axis. The shank 71 transitions to the head 72 via a tapered neck 74.

Figure 11:
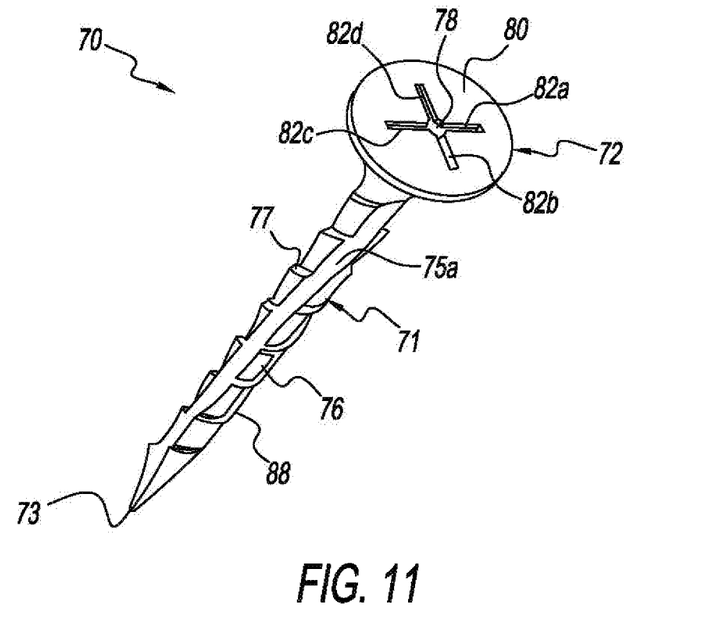
FIG. 11 is an isometric view of another exemplary construction nailing screw fashioned in accordance with the principles of the present invention.
Figure 12:
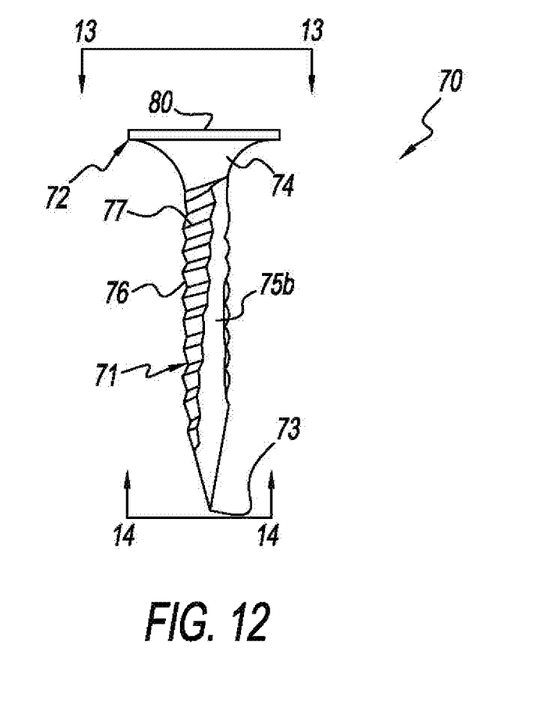
FIG. 12 is a side view of the construction nailing screw of FIG. 11.

The shank 71 has external threading 76 about its outside surface that extends generally from the neck 74 to the tip 73. The threading 76 has an upper side 77 defining a ledge that spirals along the longitudinal length of the shank 71. The upper side 77 has a high pitch or angle R relative to the longitudinal axis of the shank 71. The threading 76 has a lower side 88 that spirals along the longitudinal length of the shank 71. The lower side 88 has a low pitch or angle relative to the longitudinal axis of the shank 71. The lower side 88 has a length L in like manner to the nailing screw 10 (see FIG. 2) that is long compared to typical screw threading. The combination of a high pitched upper side 77 and a low pitched lower side 88 provides a nail screw with threading that creates minimal friction during installation of the nailing screw 70, has good retention, and allows removal by reverse rotation.

The shank 71 further includes a first flat 75a extending through the threading 56 from the neck 74 and spiraling slightly relative to the longitudinal axis to the tip 73, and a second flat 75b extending through the threading 76 from the neck 74 and spiraling slightly relative to the longitudinal axis to the tip 73. Spiraling of the flats 75a, 75b aid in rotation of the nailing screw during installation. The first and second flats 75a, 75b are preferably, but not necessarily, situated diametrically opposite one another (i.e. 180°) about the shank 71. More than two flats may be used if desired. Also, flutes may be provided rather than flats.

Figure 13:
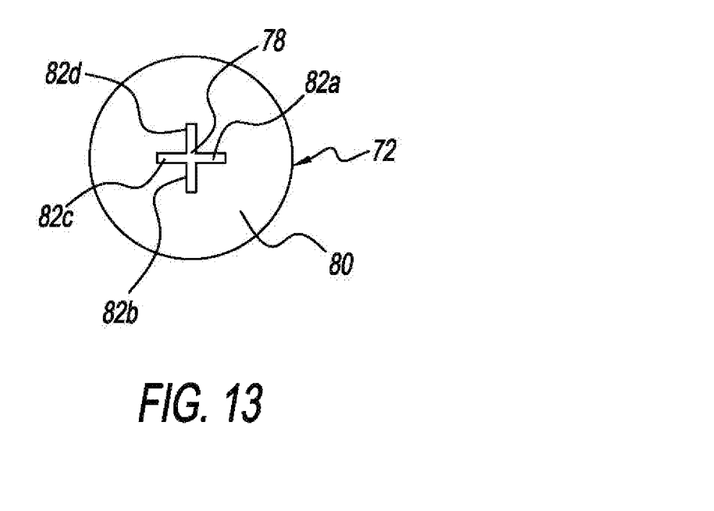
FIG. 13 is a top plan view of the construction nailing screw of FIG. 11 taken along line 13-13 of FIG. 12.
Figure 14:
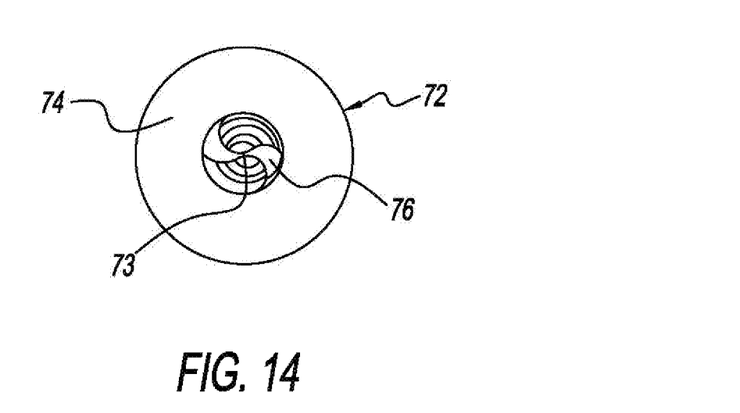
FIG. 14 is a bottom plan view of the construction nailing screw of FIG. 11 taken along line 14-14 of FIG. 12.

The head 72 is preferably, but not necessarily, an oversized round or rounded head with four slots 82a, 82b, 82c, 82d in the top 80 that are configured for receipt of a Phillips driving tool. The head 72 may have configurations for other styles or types of driving tools such as, but not limited to, slotted, Allen, Torx®, Pozidriv®, Robertson®, or other.

It should be appreciated that the angle or pitch of the upper side and the angle or pitch of the lower side of the shank threading may change as appropriate while still allowing the present construction nail/nailing screw to install like a typical nail, but provide a twist or rotation that grabs the material into which the construction nail/nailing screw is driven in like manner as a screw.

It should be further appreciated that dimensions of the components, structures, and/or features of the present nailing screws may be altered as desired within the scope of the present disclosure.

What is claimed is:

1. A construction nail comprising:
a shank having a first end, a second end, and a longitudinal axis;
a tip on the first end;
a neck on the second end;
a head on the neck;
threading on the shank extending from the tip to the neck, the threading defining a threading width, an upper side of the threading width, and a lower side of the threading width, the upper side of the threading defining an upper side angle between the longitudinal axis of the shank and a perpendicular to the longitudinal axis of the shank, the lower side of the threading defining a lower side angle between the longitudinal axis of the shank and the perpendicular to the longitudinal axis of the shank, the upper side angle steeper than the lower side angle;
a first cutout extending through the threading on the shank and co-axial with the longitudinal axis of the shank; and
a second cutout extending through the threading on the shank and co-axial with the longitudinal axis of the shank, the second cutout disposed 180° from the first cutout;
wherein the upper side angle is approximately 45°, and the lower side angle is approximately 10°.

2. A construction nail comprising:
a shank having a first end, a second end, and a longitudinal axis;
a tip on the first end;
a neck on the second end;
a head on the neck;
threading on the shank extending from the tip to the neck, the threading defining a threading width, an upper side of the threading width, and a lower side of the threading width, the upper side of the threading defining an upper side angle between the longitudinal axis of the shank and a perpendicular to the longitudinal axis of the shank, the lower side of the threading defining a lower side angle between the longitudinal axis of the shank and the perpendicular to the longitudinal axis of the shank, the upper side angle steeper than the lower side angle;
a first cutout extending through the threading on the shank and co-axial with the longitudinal axis of the shank; and
a second cutout extending through the threading on the shank and co-axial with the longitudinal axis of the shank, the second cutout disposed 180° from the first cutout;
wherein the upper side angle is 45°, and the lower side angle is 10°.

3. A construction nailing screw comprising:
a shank having a first end, a second end, and a longitudinal axis;
a pointed tip on the first end;
a neck on the second end;
a head on the neck;
threading on the shank, the threading defining a threading width, an upper side of the threading width, and a lower side of the threading width, the upper side of the threading defining an upper side angle between the longitudinal axis of the shank and a perpendicular to the longitudinal axis of the shank, the lower side of the threading defining a lower side angle between the longitudinal axis of the shank and the perpendicular to the longitudinal axis of the shank, the upper side angle steeper than the lower side angle;
a first flat extending through the threading on the shank and spiraling with respect to the longitudinal axis of the shank; and
a second flat extending through the threading on the shank and spiraling with respect to the longitudinal axis of the shank, the second flat disposed 180° from the first flat;
wherein the upper side angle is approximately 45°, and the lower side angle is approximately 10°.

4. A construction nailing screw comprising:
a shank having a first end, a second end, and a longitudinal axis;
a pointed tip on the first end;
a neck on the second end;
a head on the neck;
threading on the shank, the threading defining a threading width, an upper side of the threading width, and a lower side of the threading width, the upper side of the threading defining an upper side angle between the longitudinal axis of the shank and a perpendicular to the longitudinal axis of the shank, the lower side of the threading defining a lower side angle between the longitudinal axis of the shank and the perpendicular to the longitudinal axis of the shank, the upper side angle steeper than the lower side angle;
a first flat extending through the threading on the shank and spiraling with respect to the longitudinal axis of the shank; and
a second flat extending through the threading on the shank and spiraling with respect to the longitudinal axis of the shank, the second flat disposed 180° from the first flat;

wherein the upper side angle is 45°, and the lower side angle is 10°.

* * * * *